US012129648B2

(12) United States Patent
Espada et al.

(10) Patent No.: US 12,129,648 B2
(45) Date of Patent: Oct. 29, 2024

(54) WALL ASSEMBLY

(71) Applicant: BASF SE, Ludwigshafen am Rhein (DE)

(72) Inventors: Luis A. Espada, Wyandotte, MI (US); Eric R. Weisenbach, Wyandotte, MI (US)

(*) Notice: Subject to any disclaimer, the term of this patent is extended or adjusted under 35 U.S.C. 154(b) by 387 days.

(21) Appl. No.: 17/413,944

(22) PCT Filed: Dec. 9, 2019

(86) PCT No.: PCT/EP2019/084185
§ 371 (c)(1),
(2) Date: Jun. 14, 2021

(87) PCT Pub. No.: WO2020/120382
PCT Pub. Date: Jun. 18, 2020

(65) Prior Publication Data
US 2022/0090377 A1  Mar. 24, 2022

Related U.S. Application Data

(60) Provisional application No. 62/779,906, filed on Dec. 14, 2018.

(30) Foreign Application Priority Data

Jan. 28, 2019  (EP) .................... 19153873

(51) Int. Cl.
*B32B 21/02*  (2006.01)
*B32B 3/08*  (2006.01)
(Continued)

(52) U.S. Cl.
CPC .................. *E04B 2/70* (2013.01); *B32B 3/08* (2013.01); *B32B 5/022* (2013.01); *B32B 5/18* (2013.01);
(Continued)

(58) Field of Classification Search
CPC . E04B 2/58; E04B 2/70; E04B 1/7658; E04C 2/24; E04C 2/46; B32B 2262/0253;
(Continued)

(56) References Cited

U.S. PATENT DOCUMENTS 4,671,032 A   6/1987  Reynolds
6,780,013 B2 * 8/2004  Kubein-Meesenburg ...................
A61C 3/06
433/215

(Continued)

FOREIGN PATENT DOCUMENTS

WO   2016118493 A1   7/2016

OTHER PUBLICATIONS

International Search Report and Written Opinion for corresponding PCT/EP2019/084185, mailed May 3, 2020, 9 Pages.
(Continued)

*Primary Examiner* — Brian E Glessner
*Assistant Examiner* — Daniel J Kenny

(57) ABSTRACT

Described herein is a wall assembly for use in walls of energy efficient residential or commercial buildings which can provide improved thermal resistance, moisture resistance and structural capacity. The wall assembly includes a frame assembly, an outer fiberboard, and a closed cell foam layer. The fiberboard is laminated with a lamination such as a non-perforated, non-woven polyolefin permeable membrane. The closed cell foam layer couples the frame assembly and the outer fiberboard. Also described herein is a method of manufacturing the wall assembly.

18 Claims, 6 Drawing Sheets

(51) Int. Cl.
| | |
|---|---|
| *B32B 5/02* | (2006.01) |
| *B32B 5/18* | (2006.01) |
| *B32B 5/32* | (2006.01) |
| *B32B 7/08* | (2019.01) |
| *B32B 21/04* | (2006.01) |
| *B32B 21/10* | (2006.01) |
| *B32B 37/16* | (2006.01) |
| *E04B 1/76* | (2006.01) |
| *E04B 2/00* | (2006.01) |
| *E04B 2/58* | (2006.01) |
| *E04B 2/70* | (2006.01) |
| *E04C 2/24* | (2006.01) |
| *E04B 1/62* | (2006.01) |

(52) U.S. Cl.
CPC .................. *B32B 5/32* (2013.01); *B32B 7/08* (2013.01); *B32B 21/02* (2013.01); *B32B 21/047* (2013.01); *B32B 21/10* (2013.01); *B32B 37/16* (2013.01); *E04B 1/7658* (2013.01); *E04B 2/58* (2013.01); *E04C 2/24* (2013.01); *E04C 2/46* (2013.01); *B32B 2262/0253* (2013.01); *B32B 2266/0278* (2013.01); *B32B 2266/0285* (2013.01); *B32B 2266/08* (2013.01); *B32B 2307/306* (2013.01); *B32B 2307/7246* (2013.01); *B32B 2607/00* (2013.01); *E04B 1/625* (2013.01); *E04B 1/762* (2013.01)

(58) Field of Classification Search
CPC .... B32B 2266/0278; B32B 2266/0285; B32B 2266/08; B32B 2307/306; B32B 2307/7246; B32B 2607/00; B32B 3/08; B32B 5/022; B32B 5/18; B32B 5/32; B32B 7/08; B32B 21/02; B32B 21/047; B32B 21/10; B32B 37/16
See application file for complete search history.

(56) References Cited

U.S. PATENT DOCUMENTS

| | | | |
|---|---|---|---|
| 8,215,083 B2* | 7/2012 | Toas | E04B 1/80 52/406.1 |
| 8,696,966 B2* | 4/2014 | Smith | E04B 2/847 264/261 |
| 9,562,359 B1* | 2/2017 | Grisolia | B32B 3/266 |
| 10,415,244 B2* | 9/2019 | Giles | E04C 2/292 |
| 10,961,709 B2* | 3/2021 | Kreizinger | G01N 3/303 |
| 11,680,416 B2* | 6/2023 | Metzger | E04B 1/86 52/506.05 |
| 2005/0188649 A1 | 9/2005 | Hagen | |
| 2014/0115988 A1* | 5/2014 | Sievers | E04F 13/007 52/302.1 |
| 2014/0115991 A1 | 5/2014 | Sievers et al. | |
| 2015/0013163 A1* | 1/2015 | Martens | B25C 1/06 173/90 |
| 2022/0205242 A1* | 6/2022 | Malinowski | E04C 2/322 |

OTHER PUBLICATIONS

European Search Report for EP Patent Application No. 19153873.5, Issued on Aug. 1, 2019, 3 pages.

* cited by examiner

WALL ASSEMBLY

CROSS-REFERENCE TO RELATED APPLICATIONS

This application is a U.S. National Phase Application of International Patent Application No. PCT/EP2019/084185 filed Dec. 9, 2019, which claims priority to European Patent Application No. 19153873.5, filed Jan. 28, 2019, and which claims priority to U.S. Provisional Patent Application No. 62/779,906, filed Dec. 14, 2018, the entire contents of each of which are hereby incorporated by reference herein.

FIELD OF THE INVENTION

The presently claimed invention relates to a wall assembly. Particularly, the present invention relates to a wall assembly having a closed cell foam layer and an outer fiberboard for use in walls of residential or commercial building and a method of assembling the wall assembly.

BACKGROUND OF THE INVENTION

Wall assemblies for use as walls of a building, such as residential buildings, or commercial buildings, are known in the art. The conventional wall assembly includes a frame assembly which consists of a top member, a bottom member spaced from the top member, and a plurality of vertical members disposed between the top and bottom members. These top, bottom, and vertical members of the frame assembly are typically made of wood. In general, the top, bottom, and vertical members of the frame assembly are coupled together using fasteners, such as nails, screws and the like.

The wall assemblies may be of pre-fabricate type which are assembled offsite at a factory or warehouse. After assembly, the refabricated wall assembly is transported on-site where the building is to be constructed. The conventional prefabricated wall assembly reduces construction time to construct the building and reduces the labor cost for constructing the building.

The conventional wall assembly also includes an insulating layer coupled to the frame assembly. In one embodiment, the insulating layer comprises preformed panels made from polystyrene. The insulating layer is coupled to the frame assembly by using the fasteners. The insulting layer has minimum thermal resistance value (R-value). Further, as insulating layer comprises pre-formed panels, a plurality of seams results between adjacent panels. The seams can be a source of reduced R-value and provide a path for weather elements, such as wind and water, to enter the frame assembly, which is undesirable. In patent application No. US20140115991 a wall assembly is disclosed in which a fastener free technology is used. The closed cell foam layer couples the outer structural sheathing layer such as polystyrene to the frame assembly.

Further, in some conventional wall assemblies the exterior sheathing is coupled to the frame assembly with the fasteners. As is the case with the preformed panels of the insulating layer, the exterior sheathing is available in preformed sheets. A plurality of seams is also formed between adjacent preformed sheets of the exterior sheathing. The seams between preformed sheets of the exterior sheathing also provide a pathway for the weather elements to penetrate the frame assembly. Typically, once the weather elements penetrate the conventional prefabricated wall assembly, the weather elements penetrate the frame assembly and eventually the building itself, which causes damage to an interior sheathing, such as drywall or gypsum board.

Still further, a sheathing layer such as polystyrene is applied to the frame assembly and an exterior rigid polyurethane foam layer is applied to the exterior of the sheathing layer. Because the exterior rigid foam layer is on the exterior of the sheathing layer, the exterior rigid foam layer may become damaged during handling and installation of the wall assembly. Additionally, because the sheathing layer is directly connected to the frame assembly and is between the exterior rigid foam layer and any interior rigid foam layer, the wall assembly lacks a thermal break to prevent the flow of thermal energy from the sheathing layer through the frame assembly. WO2016118493 attempted to overcome said problem by providing a wall assembly in which a rigid foam layer is disposed between the frame assembly and sheathing layer, the rigid foam layer provides a thermal break between the sheathing layer and the frame assembly within the wall assembly. This arrangement of sheathing layer also imparts strength to the wall assembly.

In some cases, once the conventional prefabricated wall assembly is available on-site, a barrier layer, such as Tyvek® is added to the exterior sheathing in an effort to minimize the penetration of the weather elements into the conventional prefabricated wall assembly. However, over time, the weather elements can penetrate or circumvent the barrier layer, thus penetrating the conventional prefabricated wall assembly.

Accordingly, there still exists a need to provide an improved wall assembly for use in walls of energy efficient residential or commercial building which can provide improved barrier properties, desired strength while being light weight.

SUMMARY OF THE INVENTION

A wall assembly which receives an external covering of a building is provided. The wall assembly mainly comprises a frame assembly, an outer fiberboard, and a closed cell foam layer. In one embodiment, the fiberboard is a fiberboard laminated. In one embodiment, fiberboard is laminated with a lamination comprising a non-perforated, non-woven polyolefin permeable membrane. The frame assembly is assembled with a top member, a bottom member opposite the top member, and a plurality of vertical members coupled to and extending between the top and bottom members. The frame assembly also has an interior side and an exterior side opposite the interior side. The outer fiberboard of the wall assembly includes has an interior surface and an exterior surface. The interior surface is coupled to the frame assembly and extending from the exterior side of the frame assembly and terminating at the exterior surface of the outer fiberboard.

The frame assembly and the outer fiberboard are coupled together by using a closed cell foam layer. The closed cell foam is disposed on and between said plurality of vertical members and extending from the exterior side of said frame assembly. The fiberboard is typically fastened to the frame assembly using fasteners such as nails, screws, and staples.

Additionally, a method of manufacturing the wall assembly is provided. In one embodiment, the method comprising the steps of:

providing a frame assembly having a top member, a
        bottom member opposite to said top member, and a
        plurality of vertical members coupled to and extending
        between said top and bottom members with said frame assembly having an interior side and an exterior side opposite to said interior side;

applying said closed cell foam layer on and between said plurality of vertical members and extending from said exterior side of said frame assembly;

coupling a fiberboard to said frame assembly to form said wall assembly.

BRIEF DESCRIPTION OF ACCOMPANYING DRAWINGS

Other advantages of the present invention will be readily appreciated, as the same becomes better understood by reference to the following detailed description, when considered in connection with the accompanying drawings wherein.

DETAILED DESCRIPTION OF THE INVENTION

Figure 1:
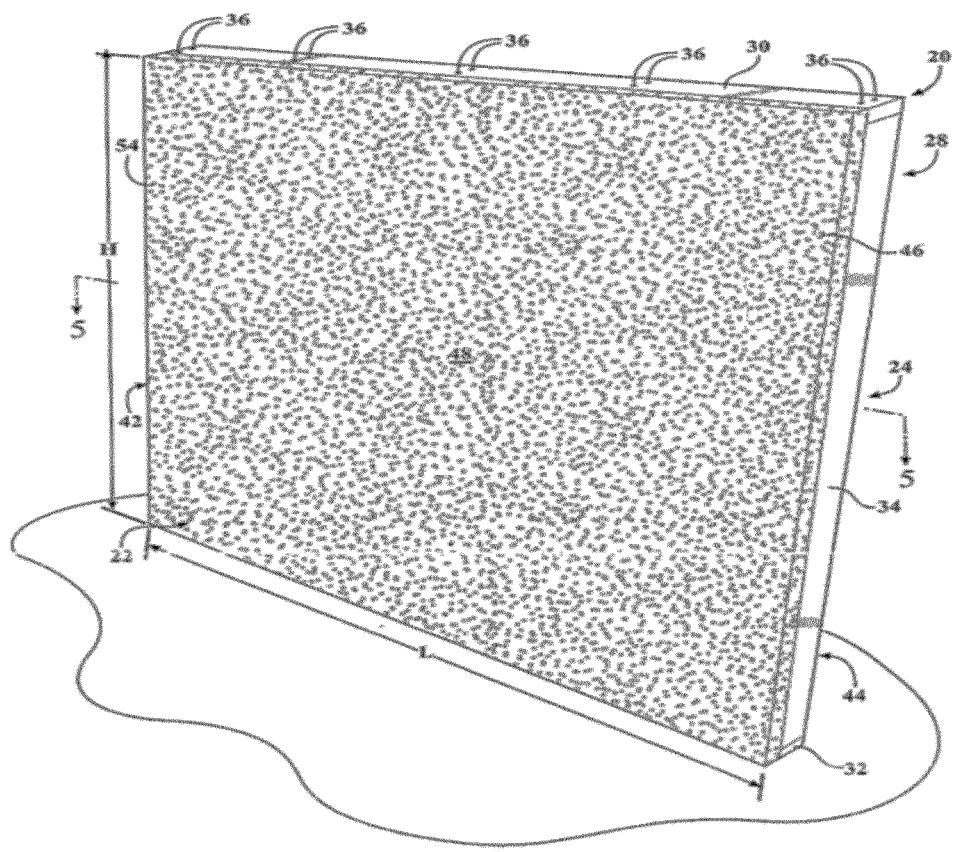
FIG. 1 is a perspective view of an exterior face of a prefabricated wall assembly having a frame assembly and an outer fiberboard.

It was an object of the present invention to provide an improved wall assembly for use in walls of energy efficient residential or commercial building which can provide thermal resistance, moisture resistance and high structural capacity.

The object was achieved by providing a wall assembly comprising a closed cell foam layer between a frame assembly and an outer fiberboard. In the presently claimed invention fiberboard is used as an outer layer of the wall assembly. The fiberboard is lighter compared to plywood and oriented strand board. It is to be appreciated that the fiber board may be natural or artificial fibers. In one embodiment, the fiberboard used is a fiberboard made of pressure laminated plies of cellulose fibers. In one embodiment, the fiberboard is laminated with a lamination. In one embodiment, the lamination comprises a non-perforated, non-woven polyolefin permeable membrane. In another embodiment, the lamination comprises a spunbonded polypropylene fabric membrane. In one embodiment, the fiberboard is pre-laminated with a lamination. In one embodiment, the lamination is coated with a heat activated adhesive which is then laminated to the fiberboard. The closed cell foam includes but is not limited to polyurethane foams, polyurea foam and combinations thereof. In one of the preferred embodiments, the sprayable closed cell foam such as polyurethane is utilized. It is found that some foams such as open cell foams are not appropriate in certain geographical areas or applications to provide the desired protection against air or moisture or heat. With open-cell foam, the tiny cells of the foam are not completely closed. The foam can be easily broken, and air can get filled within the open space inside the material. This in turn makes the foam weaker or soft compared to the closed-cell foam. In contrast, the cells present inside the closed cell foam are close to each other which results into no gap for air to fill or pass. The closed cell foam becomes more solid in structure post spray or application, has high density and provides high thermal moisture and air resistance.

In one embodiment, the wall assembly comprises a frame assembly having a top member, a bottom member opposite to said top member, and a plurality of vertical members coupled to and extending between said top and bottom members with said frame assembly having an interior side and an exterior side opposite to said interior side; an outer fiberboard having an interior surface and an exterior surface, said fiberboard coupled to said frame assembly, extending from said exterior side of said frame assembly and terminating at an exterior surface of said fiberboard; and a closed cell foam layer disposed on and between said plurality of vertical members and extending from said exterior side of said frame assembly, said closed cell foam layer couples said fiberboard to said frame assembly.

The wall assembly of the presently claimed invention is made of a material selected from wood, steel, metal, and metal alloy. In one embodiment, the wall assembly is made of wood.

In one embodiment, the fiberboard is made of pressure laminated plies of cellulose fibers.

Referring to the Figures, wherein like numerals indicate corresponding parts throughout the several views, a wall assembly is generally shown at 20. The high-performance wall assembly 20 is for constructing a building, such as a residential building or a commercial building. For example, the high-performance wall assembly 20 is at least one of a plurality of exterior walls of the building. It is to be appreciated that the high-performance wall assembly 20 may only be one of the plurality of exterior walls of the building or the high-performance wall assembly 20 may be all of the plurality of exterior walls of the building. Said differently, the high-performance wall assembly 20 may be used to construct a single exterior wall of the building.

Alternatively, multiple high-performance wall assemblies may be used to construct the exterior walls of building. Said differently, the high-performance wall assembly 20 may be coupled to another high-performance wall assembly 20 to define a perimeter of the building. Additionally, the high-performance wall assembly 20 may be coupled to a traditional field constructed wall to define the perimeter of the building. It is to be appreciated that the high-performance wall assembly 20 may be coupled to the traditional field constructed wall or another high-performance wall assembly 20 by any suitable methods. For example, fasteners, such as nails or screws, an adhesive bead, or straps could be used to the couple together the adjacent high-performance wall assemblies 20.

Generally, the high-performance wall assembly 20 has an exterior face 22, which faces an exterior of the building when the high-performance wall assembly 20 is the wall of the building. Additionally, the high-performance wall assembly 20 has an interior face 24, which faces an interior of the building when the high-performance wall assembly 20 is the wall of the building. The high-performance wall assembly 20 can be manufactured in any length L or height H desired for use as the exterior walls of the building. Additionally, the high-performance wall assembly 20 may be used completely above grade or extend below grade such that a portion of the high-performance wall assembly 20 is embedded within the ground. Furthermore, the high-performance wall assembly 20 can be used as interior walls of the building.

It is to be appreciated that the high-performance wall assembly 20 may be manufactured off-site from the location of the building. Said differently, the high-performance wall assembly 20 may be manufactured at a location that is different from the location that the building is to be constructed. For example, the high-performance wall assembly 20 can be manufactured at a factory or a warehouse and subsequently transported to the location that the building is to be constructed. Manufacturing the high-performance wall assembly 20 off-site decreases labor cost for constructing the building and decreases construction time required to construct the building once the high-performance wall assembly 20 is on-site.

Once the high-performance wall assembly 20 is delivered on-site, the high-performance wall assembly 20 is secured in position on a support structure of the building, such as a footer, foundation wall, or another high-performance wall assembly 20. It is to be appreciated that the high-performance wall assembly 20 may be positioned with the assistance of machinery, such as a crane. Alternatively, the high-performance wall assembly 20 may be manufactured on-site at the location where the building is to be constructed. However, it is to be appreciated that the high-performance wall assembly 20 may receive the exterior covering 26 prior to arriving on-site, i.e., in the factory or the warehouse.

Typically, once the high-performance wall assembly 20 is secured in position, the high-performance wall assembly 20 receives an exterior covering 26 of the building, such as cladding including siding, brick, stucco, cultured stone, fiber cement, wood, and vinyl and/or an insulating foam panel. The exterior covering 26 may be secured to the high-performance wall assembly 20 by exterior fasteners 27, such as nails, screws, or ties. For example, when the exterior covering 26 is brick, the high-performance wall assembly 20 may include brick ties as the exterior fasteners 27. Alternatively, the exterior covering 26 may be secured to the high-performance wall assembly 20 by an adhesive. For example, when the exterior covering 26 is siding, panels of the siding may be adhesively bonded to the high-performance wall assembly 20.

Figure 2:
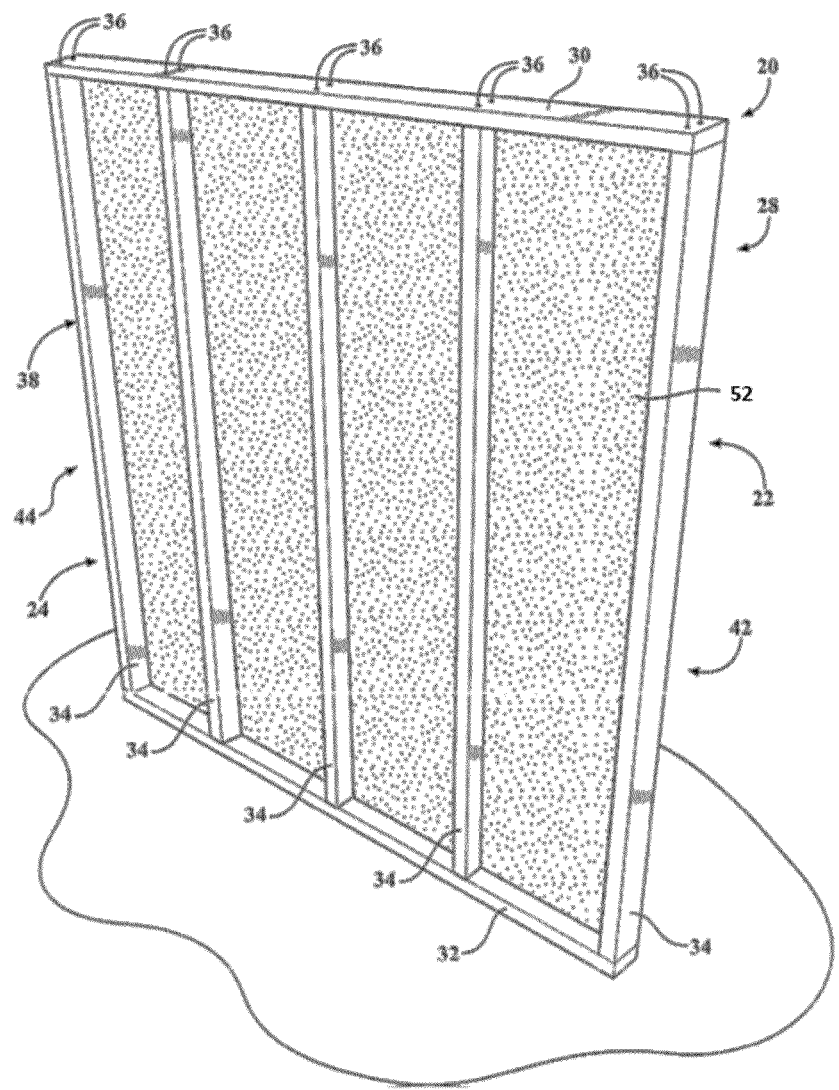
FIG. 2 is a perspective view of an interior face of a prefabricated wall assembly having a frame assembly and a foam layer.
Figure 3:
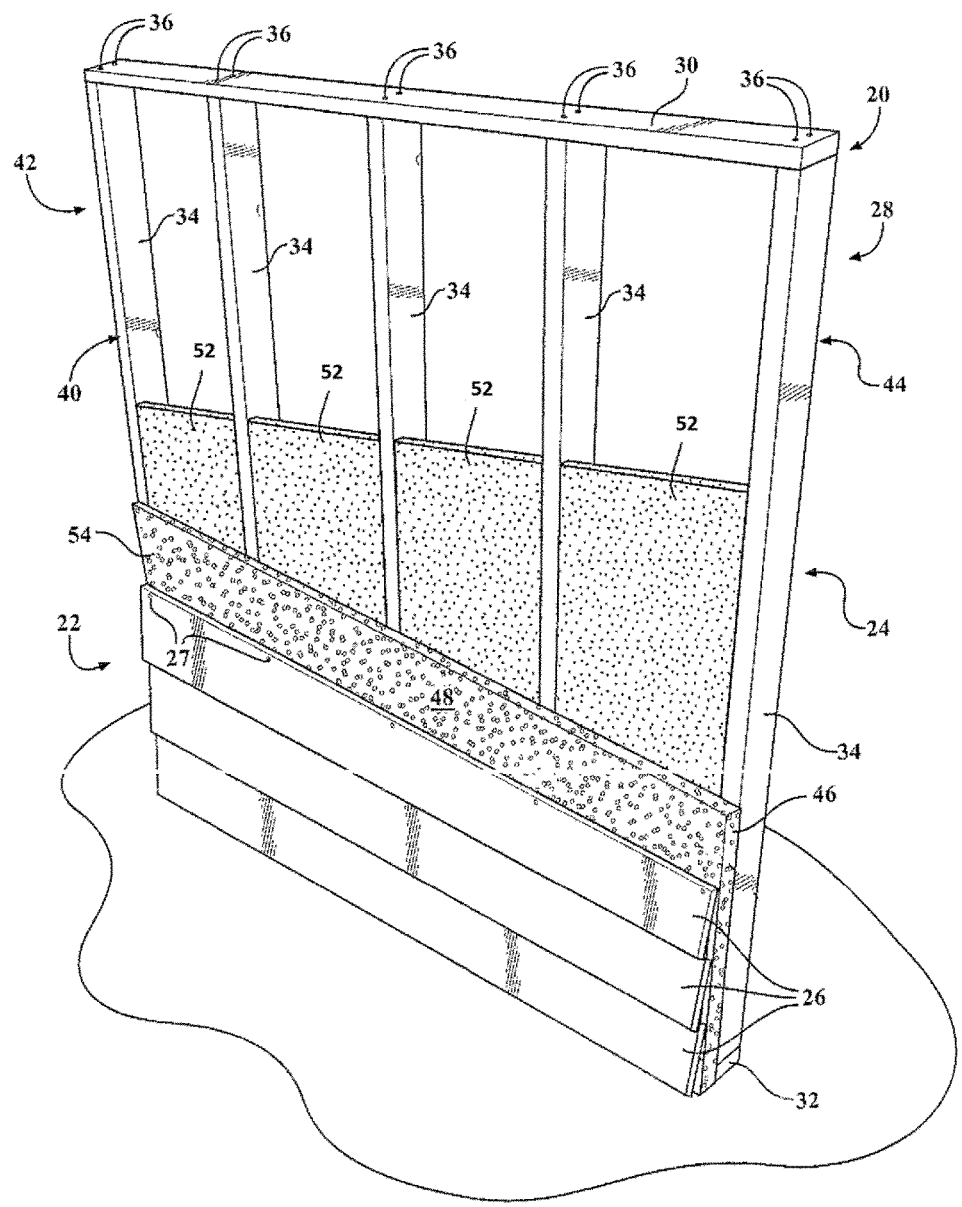
FIG. 3 is another perspective view of an exterior face of the prefabricated wall assembly having and outer fiberboard and an exterior covering coupled to the frame assembly.
Figure 4:
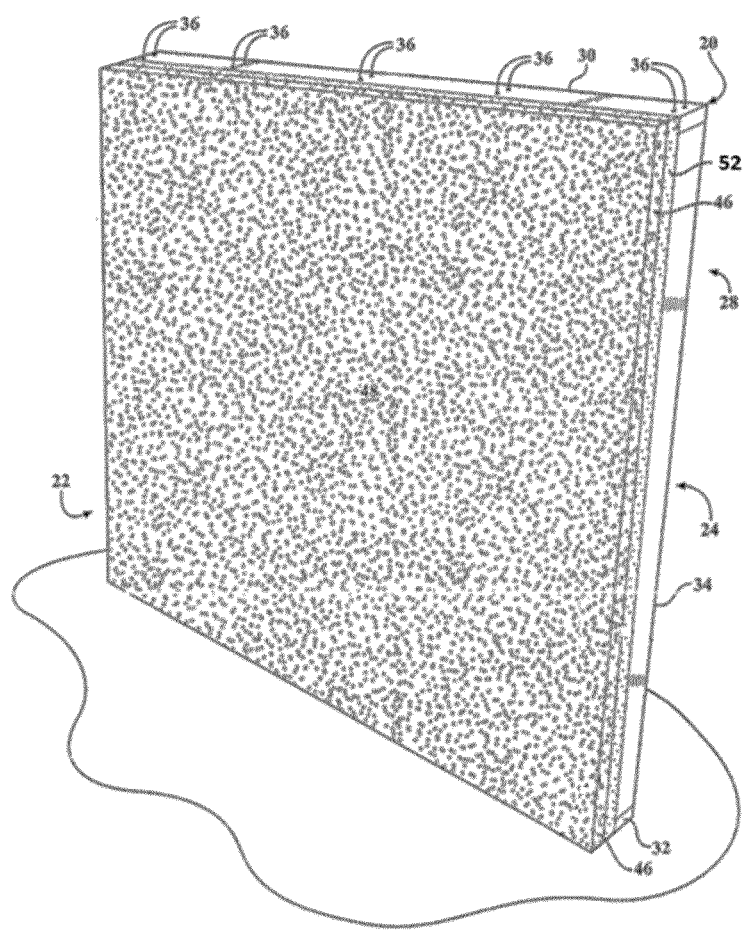
FIG. 4 is a perspective view of an exterior face of the prefabricated wall assembly with the outer fiberboard coupled to a closed foam layer.

With reference to FIGS. 1-3, the high-performance wall assembly 20 comprises a frame assembly 28. The frame assembly 28 includes a top member 30 and a bottom member 32 spaced from the top member 30. The frame assembly 28 also includes a plurality of vertical members 34 coupled to and extending between the top and bottom members 30, 32. Although not required, the top, bottom, and vertical members 30, 32, 34 may be coupled together using fasteners 36, such as nails and/or screws. Generally, the top and bottom members 30, 32 are horizontal and the vertical members 34 are perpendicular to the top and bottom members 30, 32. However, it is to be appreciated that the top and bottom members 30, 32 may be vertical with the vertical members 34 extending horizontally between the top and bottom members 30, 32.

The top, bottom, and vertical members 30, 32, 34 of the frame assembly 28 present an interior side 38 of the frame assembly 28 and an exterior side 40 of the frame assembly 28 opposite the interior side 38. Generally, when the high-performance wall assembly 20 is secured in position on the support structure of the building, the interior side 38 of the frame assembly 28 faces an interior of the building and the exterior side 40 of the frame assembly 28 faces an exterior of the building. Typically, the bottom member 32 is secured in position on the support structure of the building.

In one embodiment, the top, bottom, and vertical members 30, 32, 34 comprise wood. However, it is to be appreciated that the top, bottom, and vertical members 30, 32, 34 may comprise any suitable material, such as fiberglass, aluminum, steel, or other metals. The top, bottom, and vertical members 30, 32, 34 may be of any desired dimensions. For example, the top, bottom, and vertical members 30, 32, 34 may have a nominal cross-section of 2 inches by 4 inches or a nominal cross-section of 2 inches by 6 inches. It is to be appreciated that the top, bottom, and vertical members 30, 32, 34 may be of different dimensions relative to each other. For example, the top and bottom members 30, 32 may have the nominal cross-section of 2 inches by 6 inches and the vertical members 34 may have the nominal cross-section of 2 inches by 4 inches.

Figure 5:
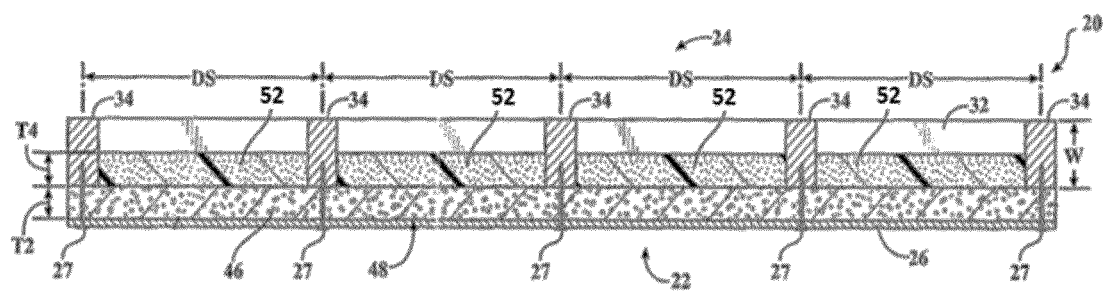
FIG. 5 is a cross-sectional view of the prefabricated wall assembly taken along line 5-5 of FIG. 1.
Figure 6:
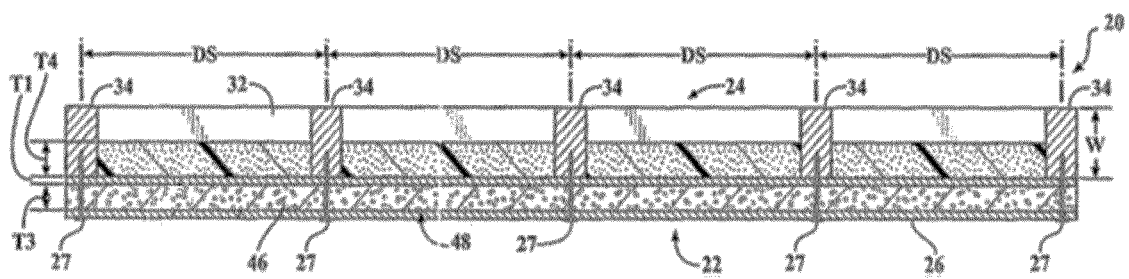
FIG. 6 is a cross-sectional view of the prefabricated wall assembly taken along line 6-6 of FIG. 4.

As best illustrated in FIG. 1, the vertical members 34 along with the top and bottom members 30, 32 define the height H of the high-performance wall assembly 20. In one embodiment, the height H of the high-performance wall assembly 20 is of from about 2 to about 24 feet. In one embodiment, the height H of the high-performance wall assembly 20 is of from about 6 to about 12 feet. In one embodiment, the height H of the high-performance wall assembly 20 is of from about 8 to about 12 feet. With reference to FIGS. 5 and 6, a nominal width W of the frame assembly 28 is defined by a width of the top, bottom, and vertical members 30, 32, 34. In one embodiment, the nominal width W of the frame assembly 28 is of from about 1 to about 8 inches. In one embodiment, the nominal width W of the frame assembly 28 is of from about 2 to about 8 inches. In one embodiment, the nominal width W of the frame assembly 28 is of from about 4 to about 6 inches.

With reference to FIGS. 1 and 2, the frame assembly 28 has a first end 42 and a second end 44 spaced from the first end 42. In one embodiment, one of the vertical members 34 is disposed at the first end 42 of the frame assembly 28 and another one of the vertical members 34 is disposed at the second end 44 of the frame assembly 28 with other vertical members 34 equally spaced between the first and second ends 42, 44 of the frame assembly 28. The length L of the high-performance wall assembly 20 is defined between the first and second ends 42, 44 of the frame assembly 28. Additionally, the top and bottom members 30, 32 are generally equal to the length L of the high-performance wall assembly 20. In one embodiment, the length L of the high-performance wall assembly 20 is of from about 1 to about 52 feet. In one embodiment, the length L of the high-performance wall assembly 20 is of from about 5 to about 25 feet. In one embodiment, the length L of the high-performance wall assembly 20 is of from about 12 to about 16 feet.

Figure 7:
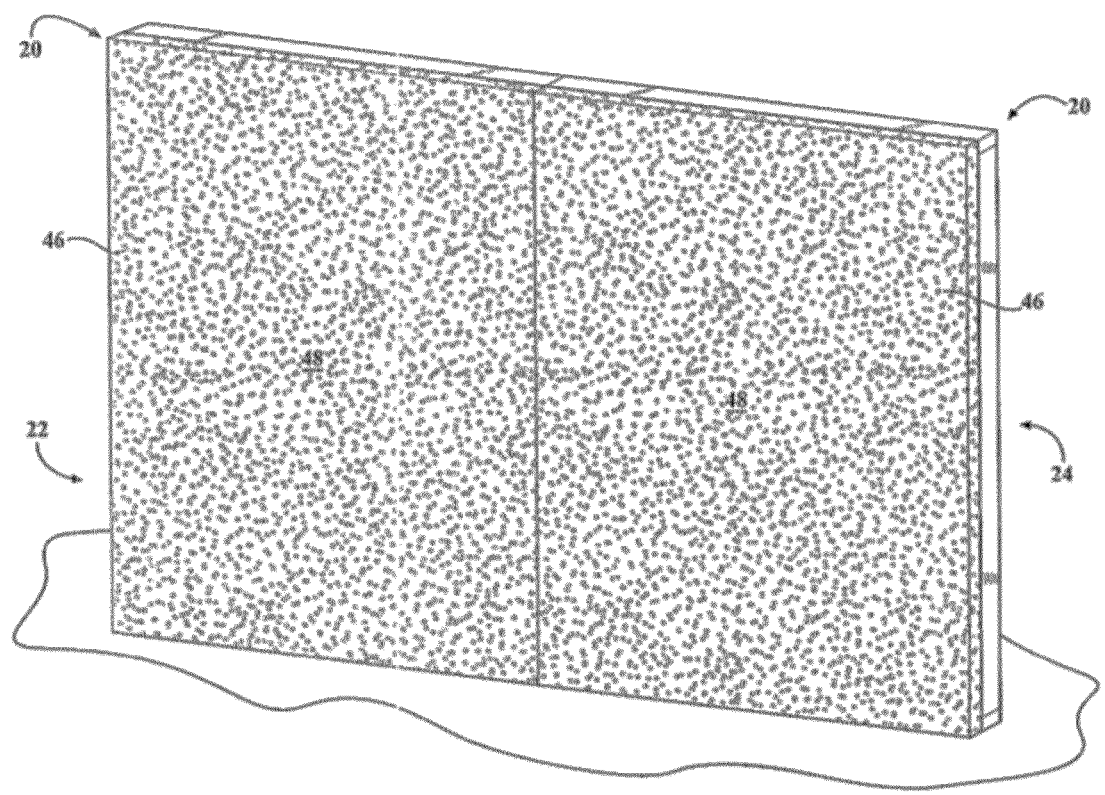
FIG. 7 is a perspective view of the exterior face of two prefabricated wall assemblies joined together.

The length L of the high-performance wall assembly 20 may vary depending on specific needs of a customer. For example, the length L of the high-performance wall assembly 20 may be equal to a length of the exterior wall of the building in which the high-performance wall assembly 20 is to be used. Alternatively, the length L of the high-performance wall assembly 20 may be shorter than the exterior wall of the building in which the high-performance wall assembly 20 is to be used such that multiple prefabricated wall assemblies are joined together, as shown in FIG. 7, to form a unitary wall of the building.

With reference to FIGS. 5 and 6, the vertical members 34 are typically spaced apart from each other a distance DS. A plurality of voids is defined between the vertical members 34. Said differently, the plurality of voids is between the vertical members 34. In one embodiment, the distance DS is measured from a centerline of one of the vertical members 34 to a centerline of another one of the vertical members 34. As alluded to above, the vertical members 34 are typically equally spaced apart throughout the frame assembly 28. However, it is to be appreciated that the distance DS between adjacent vertical members 34 may vary throughout the frame assembly 28. For example, as shown in FIG. 9, the distance DS between the vertical members 34 may vary for defining an opening in the frame assembly 28 to receive a window frame. It is to be appreciated that the distance DS between the vertical members 34 may vary for defining other openings in the frame assembly 28 to receive other desired structures, such as door frames. The distance DS between adjacent vertical members 34 is typically of from about 1 to about 30 inches, more typically of from about 10 to about 30 inches even more typically of from about 12 to about 28 inches.

With reference to FIGS. 1-3, the high-performance wall assembly 20 comprises an outer fiberboard 46 coupled to the frame assembly 28. The outer fiberboard 46 can be a preformed panel. The outer fiberboard 46 is generally planar. Said differently, an exterior surface 48 of the outer fiberboard 46 is generally parallel to the exterior side 40 of the frame assembly 28. The outer fiberboard 46 extends from the exterior side 40 of the frame assembly 28 to the exterior surface 48 of the outer fiberboard 46. The exterior surface 48 of the outer fiberboard 46 is configured to receive the exterior covering 26 of the building. The outer fiberboard 46 spaces the exterior covering 26 from the exterior side 40 of the frame assembly 28.

The outer fiberboard comprise pressure laminated plies of cellulose fibers. The fiberboard is laminated with a lamination comprising a non-perforated, non-woven polyolefin permeable membrane. In one embodiment, the outer fiberboard 46 is in the form of a sheet of rigid material having a thickness T2 or T3 typically of from about 0.1 to about 2.0 inches. In one embodiment, the outer fiberboard 46 is in the form of a sheet of rigid material having a thickness T2 or T3 of from about 0.25 to about 1 inches. In one embodiment, the outer fiberboard 46 is in the form of a sheet of rigid material having a thickness T2 or T3 of from about 0.25 to about 0.0.75 inches. The outer fiberboard is coupled to the frame assembly by mechanical fasteners such as nails, screws, staples and the like.

In one embodiment, the outer fiberboard 46 has a thickness T1 of from about 0.5 to about 12 inches. In one embodiment, the outer fiberboard 46 has a thickness T1 of from about 1 to about 8 inches. In one embodiment, the outer fiberboard 46 has a thickness T1 of from about 1 to about 3 inches. Additionally, in one embodiment, the outer fiberboard 46 has a density of from about 0.50 to about 5.00 pounds per cubic foot. In one embodiment, the outer fiberboard 46 has a density of from about 0.75 to about 4.00 pounds per cubic foot. In one embodiment, the outer fiberboard 46 has a density of from about 1.00 to about 3.00 pounds per cubic foot. Furthermore, in one embodiment, the outer fiberboard 46 has an R-value of from about 3.5 to about 7.0 per inch. In embodiment, the outer fiberboard 46 has an R-value of from about 3.5 to about 6.5 per inch. In one embodiment, the outer fiberboard 46 has an R-value of from about 4.0 to about 6.0 per inch.

With reference to FIGS. 1-5, the high-performance wall assembly 20 includes a closed cell foam layer 52 disposed on and between the vertical members 34 of the frame assembly 28 and extends from the exterior side of the frame assembly 28.

The closed cell foam layer 52 couples the outer fiberboard 46 to the frame assembly 28. Said differently, the closed cell foam layer 52 adheres the outer fiberboard 46 to the frame assembly 28.

The closed cell foam layer 52 has a cohesive strength suitable for coupling the outer fiberboard 46 to the frame assembly 28. In one embodiment, the cohesive strength of the closed cell foam layer 52 is from about 5.0 to about 50 pounds per square foot. In one embodiment, the cohesive strength of the closed cell foam layer 52 is from about 10 to about 40 pounds per square foot. In one embodiment, the cohesive strength of the closed cell foam layer 52 is from about 12 to about 35 pounds per square foot.

In one embodiment, the closed cell foam layer 52 comprises a foam selected from closed cell polyurethane foams, closed cell polyurea foams, and any combination thereof. In one embodiment, the closed cell foam layer 52 comprises a sprayable foam selected from closed cell polyurethane foams, closed cell polyurea foams, and combinations thereof. Said differently, the closed cell foam layer 52 may be spray applied to the frame assembly 28. When the sprayable foam is a polyurethane sprayable foam, the sprayable foam may be the reaction product of a polyether polyol and an isocyanate. It is to be appreciated that any polyether polyols may be used. Alternatively, when the sprayable foam is the polyurethane sprayable foam, the sprayable foam may be the reaction product of a polyester polyol and the isocyanate. The use of the polyester polyol imparts the outer fiberboard 46 with a fire retardant. When the sprayable foam is a polyurea sprayable foam, the sprayable foam is the reaction product of a polyamine and an isocyanate. An example of a suitable isocyanate for the sprayable foam is lubrinate.

In one embodiment, the closed cell foam layer 52 has a thickness T4 from about 0.1 inches to the width W of the frame assembly 28. In one embodiment, the closed cell foam layer 52 has a thickness T4 from about 0.50 to about 4.0 inches. In one embodiment, the closed cell foam layer 52 has a thickness T4 from about 1.0 to about 3.0 inches. In one embodiment, the closed cell foam layer 52 has a density of from about 0.5 to about 5.0 pounds per cubic foot. In one embodiment, the closed cell foam layer 52 has a density from about 1.0 to about 4.0 pounds per cubic foot. In one embodiment, the closed cell foam layer 52 has a density from about 1.5 to about 4.0 pounds per cubic foot. In one embodiment, the closed cell polyurethane foam layer disposed on and between the plurality of vertical members has a thickness of from about 0.75 to about 1.5 inches. Furthermore, in one embodiment, the closed cell foam layer 52 has an R-value per inch of thickness of from about 3 to about 9. In one embodiment, the closed cell foam layer 52 has an R-value per inch of thickness from about 4 to about 8, and even more typically of from about 5 to about 7.

The combination of the outer fiberboard and the closed cell foam layer provides the high-performance wall assembly 20 with the sheer strength to resist axial loads, shear loads, and lateral loads applied to the high-performance wall assembly 20.

Generally, the outer fiberboard 46 and the closed cell foam layer 52 provide the high-performance wall assembly 20 with the thermal resistance. Said differently, the outer fiberboard 46 and the closed cell foam layer 52 insulate the high-performance wall assembly 20. The thickness T2 of the outer fiberboard 46 and the thickness T4 of the closed cell foam layer 52 may be varied to adjust the thermal resistance of the high-performance wall assembly 20. Generally, a desired thermal resistance varies depending on the climate of the location where the building is to be constructed. As such, the thickness T1 of the outer fiberboard 46 and the thickness T4 of the closed cell foam layer 52 may be adjusted to provide the high-performance wall assembly 20 with the desired thermal resistance. In one embodiment, the thermal resistance of the high-performance wall assembly 20 has an R-value of from about 10 to about 53 units. In one embodiment, the wall assembly 20 has an R-value of from about 10 to about 30 units. In one embodiment, the wall assembly 20 has an R-value of from about 12 to about 28 units.

In one embodiment, the high-performance wall assembly 20 may further comprise a barrier layer 54 coupled to the exterior surface 48 of the outer fiberboard 46. The barrier layer 54 may be an additional vapor retarder, and/or a radiant barrier. For example, the barrier layer may be a sprayable vapor retarder such as acrylic-latex. In one embodiment, the sprayable vapor retarder is applied to the exterior surface 48 of the outer fiberboard 46.

In one exemplary embodiment, the wall assembly comprises:
  a frame assembly having a top member, a bottom member opposite to said top member, and a plurality of vertical members coupled to and extending between said top and bottom members with said frame assembly having an interior side and an exterior side opposite to said interior side;
  an outer fiberboard having an interior surface and an exterior surface, said fiberboard coupled to said frame assembly, extending from said exterior side of said frame assembly and terminating at an exterior surface of said fiberboard; and
  a closed cell foam layer comprising a sprayable foam selected from the group consisting of polyurethane foams, polyurea foam and combinations thereof disposed on and between said plurality of vertical members and extending from said exterior side of said frame assembly, said closed cell foam layer couples said fiberboard to said frame assembly,
  wherein, said fiberboard is a laminated with a lamination comprising a non-perforated, non-woven polyolefin permeable membrane.

In one exemplary embodiment, the wall assembly comprises:
  a frame assembly having a top member, a bottom member opposite to said top member, and a plurality of vertical members coupled to and extending between said top and bottom members with said frame assembly having an interior side and an exterior side opposite to said interior side;
  an outer fiberboard having an interior surface and an exterior surface, said fiberboard coupled to said frame assembly, extending from said exterior side of said frame assembly and terminating at an exterior surface of said fiberboard; and
  a closed cell foam layer comprising a sprayable foam selected from the group consisting of polyurethane foams, polyurea foam and combinations thereof disposed on and between said plurality of vertical members and extending from said exterior side of said frame assembly, said closed cell foam layer couples said fiberboard to said frame assembly,
  wherein, the lamination comprises a spunbonded polypropylene fabric membrane.

In another exemplary embodiment, the wall assembly comprises:
  a frame assembly having a top member, a bottom member opposite to said top member, and a plurality of vertical members coupled to and extending between said top and bottom members with said frame assembly having an interior side and an exterior side opposite to said interior side;
  an outer fiberboard having an interior surface and an exterior surface, said fiberboard coupled to said frame assembly, extending from said exterior side of said frame assembly and terminating at an exterior surface of said fiberboard; and
  a closed cell foam layer comprising a sprayable foam selected from the group consisting of polyurethane foams, polyurea foam and combinations thereof disposed on and between said plurality of vertical members and extending from said exterior side of said frame assembly, said closed cell foam layer couples said fiberboard to said frame assembly,
  wherein, said fiberboard is a fiberboard made of pressure laminated plies of cellulose fibers, laminated with a lamination comprising a non-perforated, non-woven polyolefin permeable membrane.

In accordance with another aspect of the present invention there is also provided a method of manufacturing the high-performance wall assembly 20 described herein above. The method includes the step of providing the frame assembly 28. It is to be appreciated that the step of providing the frame assembly 28 may be further defined as assembling the frame assembly 28. It is also to be appreciated that the step of assembling the frame assembly 28 may be further defined as arranging the top member 30, the bottom member 32, and the vertical members 34 to present the frame assembly 28.

In the next step, the closed cell foam layer 52 is applied to the frame assembly 28. It is to be appreciated that the closed cell foam layer is disposed on and between the plurality of vertical members and extending from the exterior side of the frame assembly.

More specifically, the step of applying the closed cell foam layer 52 may be further defined as spraying the closed cell foam layer 52 onto and between the vertical members 34, the top member 30, and the bottom member 32 of the frame assembly 28.

As indicated above, the closed cell foam layer 52 may be spray applied to the frame assembly 28 and the interior surface of the outer fiberboard 46. The closed cell foam layer 52 is cured to couple the frame assembly 28 together and/or to couple the outer fiberboard 46 to the frame assembly 28 to form the high-performance wall assembly 20.

Finally, the outer fiberboard 46 is coupled to the frame assembly 28 using fastener/s selected from nails, screws and staples.

In one embodiment, of the present invention, the outer fiberboard 46 is positioned adjacent the frame assembly 28. It is to be appreciated that the outer fiberboard 46 may be placed flat on the ground and the frame member placed onto on the outer fiberboard 46. Additionally, the top member 30, the bottom member 32, and the vertical members 34 may be arranged on top of the outer fiberboard 46. The closed cell foam layer 52 may be sprayed or disposed between the outer fiberboard 46 and the frame assembly 28.

In another aspect, there is provided use of a wall assembly as a wall of a building, having improved load, structural stability, thermal and moisture resistance.

While the invention has been described with reference to an exemplary embodiment, it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A wall assembly comprising:
    a frame assembly having a top member, a bottom member opposite to said top member, and a plurality of vertical members coupled to and extending between said top and bottom members with said frame assembly having an interior side and an exterior side opposite to said interior side;
    an outer fiberboard having an interior surface and an exterior surface, said fiberboard coupled to said frame assembly, extending from said exterior side of said frame assembly and terminating at an exterior surface of said fiberboard, wherein the fiberboard is laminated with a lamination comprising a non-perforated, non-woven polyolefin permeable membrane; and
    a closed cell foam layer disposed on and between said plurality of vertical members and extending from said exterior side of said frame assembly, said closed cell foam layer couples said fiberboard to said frame assembly;
    wherein the outer fiberboard has a thickness of from about 0.5 to about 12 inches;
    wherein the closed cell foam layer has an R-value per inch of thickness of from about 3 to about 9, wherein the closed cell foam layer has a thickness of from about 0.75 to about 1.5 inches;
    wherein the wall assembly has an R-value of from about 10 to about 53 units.

2. The wall assembly according to claim 1, wherein the fiberboard is mechanically fastened to the frame assembly.

3. The wall assembly according to claim 1, wherein the wall assembly is made at least in part of a material selected from the group consisting of wood, steel, metal, and metal alloy.

4. The wall assembly according to claim 1, wherein the fiber board is made of natural or artificial fibers.

5. The wall assembly according to claim 1, wherein the fiberboard is made of pressure laminated plies of cellulose fibers.

6. The wall assembly according to claim 1, wherein the fiberboard is mechanically fastened to the frame assembly using fasteners selected from the group consisting of nails, screws and staples.

7. The wall assembly according to claim 1, wherein the closed cell foam layer comprises a foam selected from the group consisting of polyurethane foams, polyurea foam and any combination thereof.

8. The wall assembly according to claim 1, wherein the closed cell foam layer comprises a sprayable foam selected from the group consisting of polyurethane foams, polyurea foam and any combination thereof.

9. The wall assembly according to claim 1, wherein the fiberboard is bonded directly to the closed cell foam layer such that said foam layer and said fiberboard forms a laminated composite layer.

10. A method of using the wall assembly according to claim 1, the method comprising using the wall assembly as a wall of a building.

11. A wall assembly comprising:
    a frame assembly having a top member, a bottom member opposite to said top member, and a plurality of vertical members coupled to and extending between said top and bottom members with said frame assembly having an interior side and an exterior side opposite to said interior side;
    an outer fiberboard having an interior surface and an exterior surface, said fiberboard coupled to said frame assembly, extending from said exterior side of said frame assembly and terminating at an exterior surface of said fiberboard; and
    a closed cell foam layer comprising a sprayable foam selected from the group consisting of polyurethane foams, polyurea foam and combinations thereof disposed on and between said plurality of vertical members and extending from said exterior side of said frame assembly, said closed cell foam layer couples said fiberboard to said frame assembly,
    wherein said fiberboard is a fiberboard made of pressure laminated plies of cellulose fibers, laminated with a lamination comprising a non-perforated, non-woven polyolefin permeable membrane;
    wherein the outer fiberboard has a thickness of from about 0.5 to about 12 inches;
    wherein the closed cell foam layer has an R-value per inch of thickness of from about 3 to about 9, wherein the closed cell foam layer has a thickness of from about 0.75 to about 1.5 inches;
    wherein the wall assembly has an R-value of from about 10 to about 53 units.

12. The wall assembly according to claim 11, wherein said assembly is adapted to receive an exterior covering of a building, said covering comprises cladding, and insulating foam panel, said cladding comprises sidding, brick, stucco, cultured stone, fiber cement, wood, and vinyl.

13. The wall assembly according to claim 12, wherein the exterior covering is secured to the wall assembly by exterior fasteners comprising nails, screws, or ties.

14. A method of manufacturing a wall assembly comprising i) a frame assembly; ii) an outer fiberboard; and iii) a closed cell foam layer coupling said frame assembly and said outer fiberboard; said method comprising the steps of:
    providing the frame assembly having a top member, a bottom member opposite to said top member, and a plurality of vertical members coupled to and extending between said top and bottom members with said frame assembly having an interior side and an exterior side opposite to said interior side;
    applying said closed cell foam layer on and between said plurality of vertical members and extending from said exterior side of said frame assembly; and
    coupling said fiberboard to said frame assembly to form said wall assembly, wherein the fiberboard is laminated with a lamination comprising a non-perforated, non-woven polyolefin permeable membrane;
    wherein the outer fiberboard has a thickness of from about 0.5 to about 12 inches;
    wherein the closed cell foam layer has an R-value per inch of thickness of from about 3 to about 9, wherein the closed cell foam layer has a thickness of from about 0.75 to about 1.5 inches;
    wherein the wall assembly has an R-value of from about 10 to about 53 units.

15. The method of manufacturing a wall assembly according to claim 14, wherein the outer fiberboard is mechanically fastened to said frame assembly using a fastener selected from the group consisting of nails, screws and staples.

16. The method of manufacturing a wall assembly according to claim 14, wherein the closed cell foam layer comprises a sprayable foam selected from the group consisting of polyurethane foams, polyurea foam and combinations thereof.

17. The method of manufacturing a wall assembly according to claim 14, wherein the step of applying said closed cell foam layer comprises spraying polyurethane foam.

18. The method of manufacturing a wall assembly according to claim 14, wherein the outer fiberboard is made of natural or artificial fibers.

* * * * *